Figure 1:
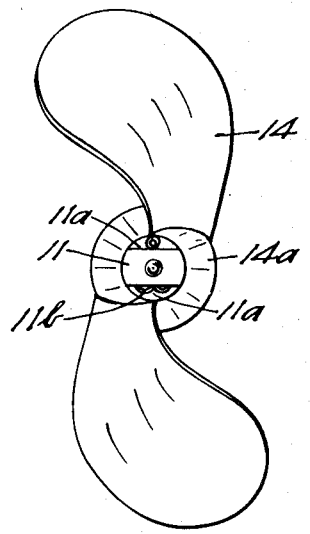

June 23, 1953     M. F. SNYDER     2,642,730

PROPELLER CLUTCH STRUCTURE

Filed June 9, 1948

Inventor
Merton F. Snyder
By Chas. C. Reif
Attorney

Patented June 23, 1953

2,642,730

UNITED STATES PATENT OFFICE 2,642,730

PROPELLER CLUTCH STRUCTURE

Merton F. Snyder, Minneapolis, Minn., assignor to Scott-Atwater Manufacturing Company, Minneapolis, Minn., a corporation of Minnesota Application June 9, 1948, Serial No. 31,907

7 Claims. (Cl. 64—28)

This invention relates to a structure of mounting a propeller on a propeller shaft and particularly to a propeller mounting involving a friction clutch. While the invention could be used for mounting various types of propellers, it has been particularly designed for a propeller used on an outboard motor.

It is an object of this invention to provide a mounting for a propeller including an adjustable friction clutch, said clutch being held in adjusted position by a pin extending through the propeller shaft which also acts as a shear pin for said propeller.

It is another object of the invention to provide a propeller shaft structure comprising a shaft, an abutment means at one end of the shaft, such as the usual tapered end member, a sleeve on said shaft engaging said means, a propeller having a hub mounted on said sleeve and having a frusto-conical recess therein surrounding said sleeve, a frusto-conical shell adapted to engage the wall of said recess and mounted on said sleeve for adjustment longitudinally thereof to determine the friction, together with a pin holding said shell and sleeve in adjusted position and also acting as a shear pin.

It is further an object of the invention to provide such a structure as set forth in the above paragraph in which a shell or bushing of frictional material is disposed in the recess of said propeller and engaged by said shell, which shell may be made of metal, such as bronze or brass, or may be made of plastic.

It is more specifically an object of the invention to provide a propeller mounting comprising a propeller shaft, an end member secured to one end of said shaft, a sleeve mounted on said shaft having a peripheral flange at one end engaging said end member and being threaded on its periphery, a propeller having a hub mounted on said sleeve, resilient spacing means between the end of said hub and said flange, said hub having a frusto conical recess therein surrounding said sleeve and a shell threaded on said sleeve and adapted to frictionally engage the wall of said recess, together with means for holding said shell and sleeve in the desired adjustment.

Figure 2:
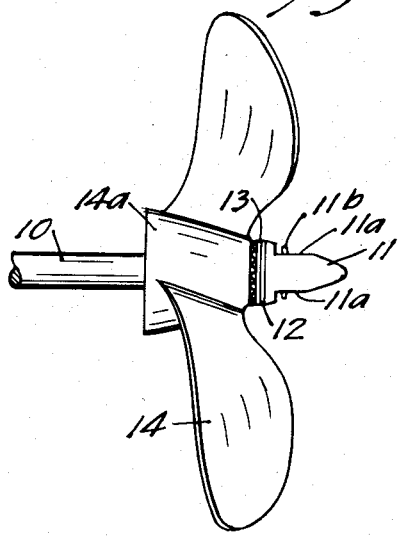
Figure 3:
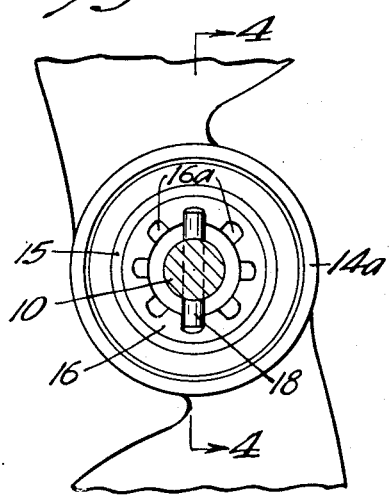
Figure 4:
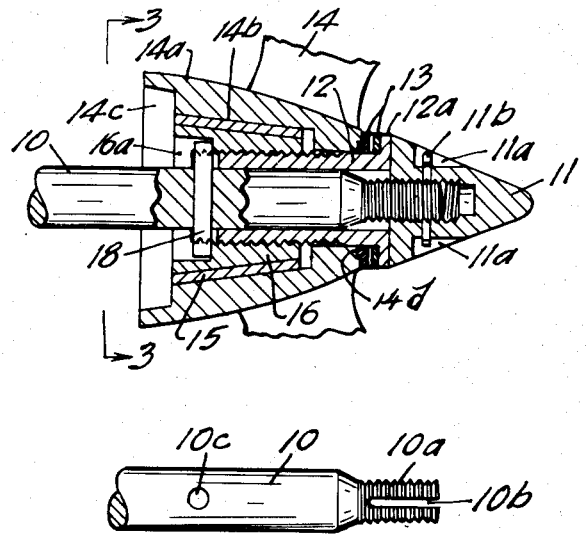
Figure 5:
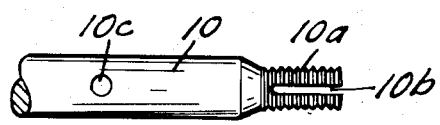
Figure 6:
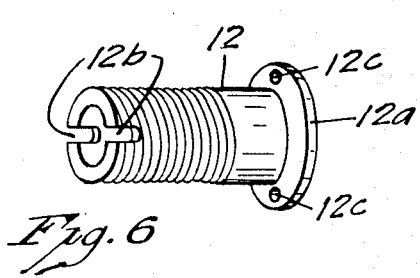

These and other objects and advantages of the invention will be fully set forth in the following description made in connection with the accompanying drawings in which like reference characters refer to similar parts throughout the several views and in which:

Fig. 1 is a view in end elevation of the device;
Fig. 2 is a view in side elevation;
Fig. 3 is a vertical section taken on line 3—3 of Fig. 4, as indicated by the arrows;
Fig. 4 is a vertical section taken substantially on line 4—4 of Fig. 3, as indicated by the arrows;
Fig. 5 is a view of one end of the propeller shaft used; and
Fig. 6 is a perspective view of a sleeve used.

Referring to the drawings a propeller mounting is shown comprising a propeller shaft 10, the same having a reduced threaded end portion 10a, which portion is provided with a longitudinally extending central slot 10b. An end member 11 is threaded on portion 10a and is secured in definite position by having a pin 11b extend therethrough and through the slot 10b. Member 11 is provided with recesses 11a at each side to accommodate the ends of pin 11b which may be an ordinary cotter pin. A sleeve 12 fits on shaft 10, the same having a peripheral flange 12a at one end which abuts the inner end of member 11, as shown in Figs. 2 and 4. Member 11 is tapered toward its outer end, which outer end is rounded. One or more washers 13 surround sleeve 12 adjacent flange 12a, the outer diameters of which are substantially the same as that of flange 12a and one of these washers is of the spring or resilient type. The washer adjacent hub 14a is preferably of fiber or plastic material and the metallic spring washer is adjacent this fiber washer. A propeller 14 is provided, the same having a hub 14a which tapers toward its outer end, which end is bored to fit on the sleeve 12, the end of said hub engaging the inner washer 13. Hub 14a has a slight depression 14d in its end into which plastic washer 13 is pressed. Hub 14a has a frusto-conical recess 14b therein, the outer portion of which surrounds sleeve 12, and said recess may have disposed therein a bushing 15 of friction material such as commonly used for clutch linings. Hub 14a thus has a recess therein formed by the inner wall of bushing 15. The outer end of hub 14a is provided with a counterbore 14c. A shell 16 of frusto-conical form is provided, the same being bored and threaded to be screwed onto the sleeve 12. The inner end of sleeve 12 is provided with a transverse slot 12b. The inner end of shell 16 is provided with a plurality of circumferentially spaced slots or recesses 16a. A pin 18 extends through a hole 10c in shaft 10 and through the slot 12b in sleeve 12 and has its ends disposed in a pair of the recesses 16a.

In assembling the device the bushing 15 will be placed in the recess 14b and shell 16 will then be placed inside of bushing 15. Sleeve 12 with washers 13 thereon will be screwed into shell 16 from the front end. Holes 12c are provided in flange 12a to accommodate a spanner wrench so that sleeve 12 can be turned. Hub 14a is drawn tightly against the washers 13. It is desired to have a slight resiliency at the end of hub 14a. Sleeve 12 can be turned further and this will draw shell 16 inwardly thus pressing it against the frictional bushing 15. The pressure of shell 16 against the bushing 15 or the wall of the recess 14b can be determined as desired. When the desired friction has been secured the slot 12b will be aligned with a pair of the recesses 16a. Pin 18 which has been placed in the shaft will now be moved into slot 12b and into the opposite recesses 16a in alignment therewith. This will hold or lock members 12 and 16 in definite position. The end member 11 can now be screwed on the end of shaft 10 and secured thereon by the cotter pin 11b. In the operation of the motor, shaft 10 is driven which drives the propeller. Should some obstruction be encountered by the propeller which would be sufficient to overcome the friction between shell 16 and bushing 15, shell 16 will revolve so that the propeller can remain stationary and will not be broken. The pin 18 is also designed to act as a shear pin so that in case the clutch did not operate or shell 16 became stuck or did not turn when the propeller was stopped or struck some obstruction, pin 18 would be sheared off and shaft 10 could then revolve freely without damaging the propeller. The pin 18 therefore has the double function of forming a holding or locking means to determine the frictional engagement of the clutch and also acts as a shear pin.

From the above description it will be seen that I have provided a simple, compact and highly efficient driving mechanism for a propeller. The frictional resistance of the clutch or between members 15, 16 and 14a can be predetermined and this adjustment can be maintained by pin 18, which, as stated, will also act as a shear pin. The structure is very compact, the same has been demonstrated in actual practice and found to be successful and efficient, and is being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A propeller clutch mechanism having in combination, a shaft, an abutment means at one end of said shaft, a sleeve on said shaft engaging said abutment, a propeller having a hub with a frusto-conical recess therein surrounding said sleeve, a bushing fitting in said recess a frusto-conical shell movable longitudinally on said sleeve and engaging the inner wall of said bushing, a pin extending through said shaft, said shell and sleeve having means for receiving said pin, said pin acting to hold said shell in position longitudinally of said sleeve and thus the position of said shell determines the amount of friction of said shell on said propeller, said pin also acting as a shear pin for said propeller.

2. A propeller clutch structure having in combination, a shaft, an abutment means at one end of said shaft, a sleeve on said shaft engaging said abutment and threaded on its periphery, a propeller having a hub comprising a frusto-conical recess therein surrounding said sleeve, a frusto-conical shell threaded on said sleeve for movement longitudinally thereof and engaging the wall of said recess, said shell having circumferentially spaced recesses therein and a pin extending through said shaft, engaging said sleeve and adapted to be disposed in certain of said recesses to hold said shell and sleeve in fixed relative position with a certain friction on said propeller, said pin also acting as a shear pin for said propeller.

3. A propeller clutch structure having in combination, a shaft, an end member secured to one end of said shaft, a sleeve fitting on said shaft and engaging the inner end of said end member, a propeller having a hub bored to fit on said sleeve and having a frusto-conical recess therein surrounding said sleeve, a bushing of frictional material in said recess, a shell mounted on said sleeve arranged to engage said bushing and adjustable longitudinally on said sleeve to give the desired friction between said bushing and hub, said shell having a plurality of circumferentially spaced recesses therein and a pin extending through said shaft engaging said sleeve and adapted to be disposed in certain of said recesses to hold said sleeve and last mentioned shell in the desired relative positions, longitudinally of said sleeve, said pin also acting as a shear pin for said propeller.

4. A propeller clutch structure having in combination, a shaft, a tapered end member secured to one end of said shaft, a sleeve fitting on said shaft having a peripheral flange at one end, a propeller having a hub bored to fit on said sleeve, means between the ends of said hub and said flange for positioning said hub on said sleeve, said hub comprising a frusto-conical recess therein surrounding said sleeve, a shell mounted on said sleeve and movable for adjustment longitudinally of said sleeve to frictionally engage the wall of said recess, and a pin extending through said shaft and engaging said sleeve and shell and holding the same in adjusted longitudinal relation, said pin also acting as a shear pin for said propeller.

5. The structure set forth in claim 4, said means comprising a plurality of washers, one of which is a spring washer.

6. The structure set forth in claim 4, and a frusto-conical shell of plastic material disposed in said hub the inner surface of which forms said recess and which is engaged by said shell.

7. A propeller clutch structure having in combination, a shaft, a sleeve on said shaft having a flange at one end, a propeller having a hub mounted on said sleeve, resilient spacing means between said hub and flange, said hub containing a frusto-conical recess therein surrounding said sleeve, a frusto-conical shell threaded on and thus longitudinally adjustable on said sleeve engaging the inner wall of said recess, and means for securing said sleeve and shell in adjusted position to give the desired friction between said shell and wall and for connecting said shell to said shaft.

MERTON F. SNYDER.

References Cited in the file of this patent

UNITED STATES PATENTS

| Number | Name | Date |
|---|---|---|
| 788,810 | Ambler | May 2, 1905 |
| 2,111,245 | Irgens | Mar. 15, 1938 |
| 2,569,144 | Benson | Sept. 25, 1951 |